United States Patent
Wright

Patent Number: 6,105,212
Date of Patent: Aug. 22, 2000

[54] UNIVERSAL MUFFLER OR HOSE CLAMP AND RATCHET TIGHTENING DEVICE COMBINATION

[76] Inventor: Dean E. Wright, 1218 4th NW., New Philadelphia, Ohio 44663

[21] Appl. No.: 09/268,477

[22] Filed: Mar. 16, 1999

Related U.S. Application Data

[63] Continuation-in-part of application No. 08/949,289, Oct. 13, 1997, abandoned.

[51] Int. Cl.[7] .............................. B65D 63/00; F16L 33/02
[52] U.S. Cl. ........................................ 24/273; 24/20 TT
[58] Field of Search .................. 24/20 TT, 273, 24/274 R, 279, 280; 285/252, 409

[56] References Cited

U.S. PATENT DOCUMENTS

| | | | |
|---|---|---|---|
| 1,414,731 | 5/1922 | Englund | 24/20 TT |
| 1,965,207 | 7/1934 | Walker | 24/20 TT |
| 2,226,936 | 12/1940 | Markey | 285/409 |
| 3,491,411 | 1/1970 | Basson | 24/20 TT |
| 3,981,049 | 9/1976 | Oetiker | 24/20 TT |
| 4,083,086 | 4/1978 | Oetiker | 24/20 TT X |
| 4,587,870 | 5/1986 | Colburn | 24/70 SK |

FOREIGN PATENT DOCUMENTS

| | | | |
|---|---|---|---|
| 2452655 | 11/1980 | France | 24/20 TT |
| 1187079 | 2/1965 | Germany | 24/20 TT |

*Primary Examiner*—James R. Brittain
*Assistant Examiner*—Robert J. Sandy
*Attorney, Agent, or Firm*—John D. Gugliotta

[57] ABSTRACT

An adjustable muffler or radiator hose clamp is provided having a spring steel band and utilizes a pivoting lever and ratchet system to tighten the muffler or radiator hose clamp. A tongue closes through the lever; once the desired size is achieved, the clever is snapped shut and holds the pieces together. To remove the clamp, the lever is raised and pressure released.

1 Claim, 5 Drawing Sheets

UNIVERSAL MUFFLER OR HOSE CLAMP AND RATCHET TIGHTENING DEVICE COMBINATION

RELATED APPLICATIONS

The present invention is a Continuation-in-Part of application Ser. No. 08/949,289 filed on Oct. 13, 1997 and abandoned on Apr. 23, 1999.

BACKGROUND OF THE INVENTION

1. Field of the Invention

The present invention relates generally to clamping devices and, more particularly, to automotive muffler clamps or radiator hose clamps.

2. Description of the Related Art

Muffler clamps are used in the exhaust systems of internal combustion engines to connect the various components, such as the tail pipe, muffler, and exhaust pipes. The usual function of a muffler clamp is to completely circumscribe and exert a 360-degree stress on the exhaust system pipe thereby decreasing its diameter and creating a frictional impingement between the components, thereby generating a clamping action.

The muffler clamps that comprise the previous art can be grouped into two categories: muffler clamps utilizing U-bolts; and muffler clamps utilizing a metal ring with overlapping members.

Muffler clamps utilizing U-bolt clamps employ a saddle, nut and U-bolt configuration. The U-bolt portion consists of a semicircular base from which legs extend. The legs are threaded and extend through the holes in the semicircular saddle. As the nut is tightened on the U-bolt leg, the bolt and saddle are drawn toward each other and create the required tension. This category of muffler clamps includes U.S. Pat. No. D273,938 issued in the name of Piper, U.S. Pat. No. 4,262,943 issued in the name of Armstrong, U.S. Pat. No. 4,056,869 issued in the name of Eisma and U.S. Pat. No. 4,506,418 issued in the name of Viola et al.

The second major category of muffler clamps employs a metal ring with end portions in overlapping contacting relation. In such a configuration a bolt extends through the aligned opening. As a nut is tightened on the bolt, the contacting relations are drawn toward each other which decreases the circumference of the interior of the ring, thereby placing tension on the exhaust pipe. This category of muffler clamps includes U.S. Pat. No. 4,640,536 issued in the name of Printisss et al., U.S. Pat. No. 4,813,718 issued in the name of Matter et al., and U.S. Pat. No. 4,953,899, issued in the name of Printiss.

Problems exist with both styles of muffler clamp devices. First, each of these devices is designed for one specific size pipe. However, exhaust pipes come in numerous diameters, depending on the make and model of automobiles. The result of these two facts is that manufactures, distributors and retailers must stock muffler clamps of many different sizes, to service the many exhaust pipes of varied diameters. This creates considerable inventory costs. Also, consumers must be sure to purchase the correct size for their particular vehicle. In roadside emergencies, where access to replacement parts may be limited, this difficulty can create a serious problem for the motorist.

Another problem exists with previous muffler clamps. Assembly and disassembly are made more difficult both in terms of time and effort. Since there are multiple components in both designs, the possibility of inadvertently dropping a bolt or nut is increased, especially given the cramped space underneath a vehicle.

The fact that a tool is required for both assembly and disassembly of each of these devices can also create difficulties for automobile owners, especially in emergency roadside situations, where access to tools may be limited.

Other problems exist with previous muffler clamp devices. Both styles leave a bolt protruding from the clamp. This protrusion creates the risk of injury to a person's hands while they are working on the exhaust system. The risk is increased by the fact that tools are required for both assembly and disassembly, and tools can inadvertently release or disengage from the bolts. The danger is further increased upon disassembly because muffler clamp nuts and bolts have a tendency to oxidize and become difficult to remove.

A search of the previous art did not disclose any references that read directly on the claims of the present invention. As a result of the cited problems in the previous art, a need has been felt for providing an apparatus which overcomes the cited problems.

SUMMARY OF THE INVENTION

It is therefore an object of the present invention to provide an improved muffler clamp.

In accordance with a preferred embodiment, the present invention is an adjustable muffler clamp comprised of a spring steel band and utilizes a pivoting lever and ratchet system to tighten the muffler clamp. A tongue goes through the lever and ratchets along the band to tighten. Once the desired size is achieved, the clasp is snapped shut and holds the pieces together. To remove the clamp, the lever is raised and pressure released.

Two major advantages of the present invention are due to the fact that it is an adjustable, or 'one-size fit's all' muffler clamp. First, since only one sized clamp is needed to service the various muffler pipes of differing diameters, investments in inventory by manufactures and distributors are reduced. Second, with only one size to choose from, it is easier for the consumer to purchase the appropriately sized muffler clamp, especially in emergency situations, where access to specialty products may be limited. Thus, the replacement process is simplified.

Other advantages of the present invention are due to the fact that it is a one-piece design. First, the risk of dropping components during assembly is reduced. Second, with fewer parts to handle, the replacement process is simplified. Third, there are no oxidized bolts to replace.

Another advantage of the present invention is that its weight is less than previous devices. This fact results in easier installation and better gas mileage.

Another advantage of the present invention is that no tool is required for either assembly and disassembly. This creates several benefits. First, in emergency situations, where access to tools may be limited, a motorist can remove and install the present invention without tools. Second, the possibility of injuring one's hands during disassembly or assembly is reduced because there is no tool that could inadvertently detach from the present invention.

Another advantage of the present invention is that there are no protruding parts that could injure one's hands. The cam lever, in the resting position, conforms to the contour of the clamping band.

Another advantage of the present invention is that it is simple and inexpensive to manufacture.

Finally, the present invention can be used in a universal fashion either to connect hoses for applications such as radiators, or pipes for applications such as mufflers.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
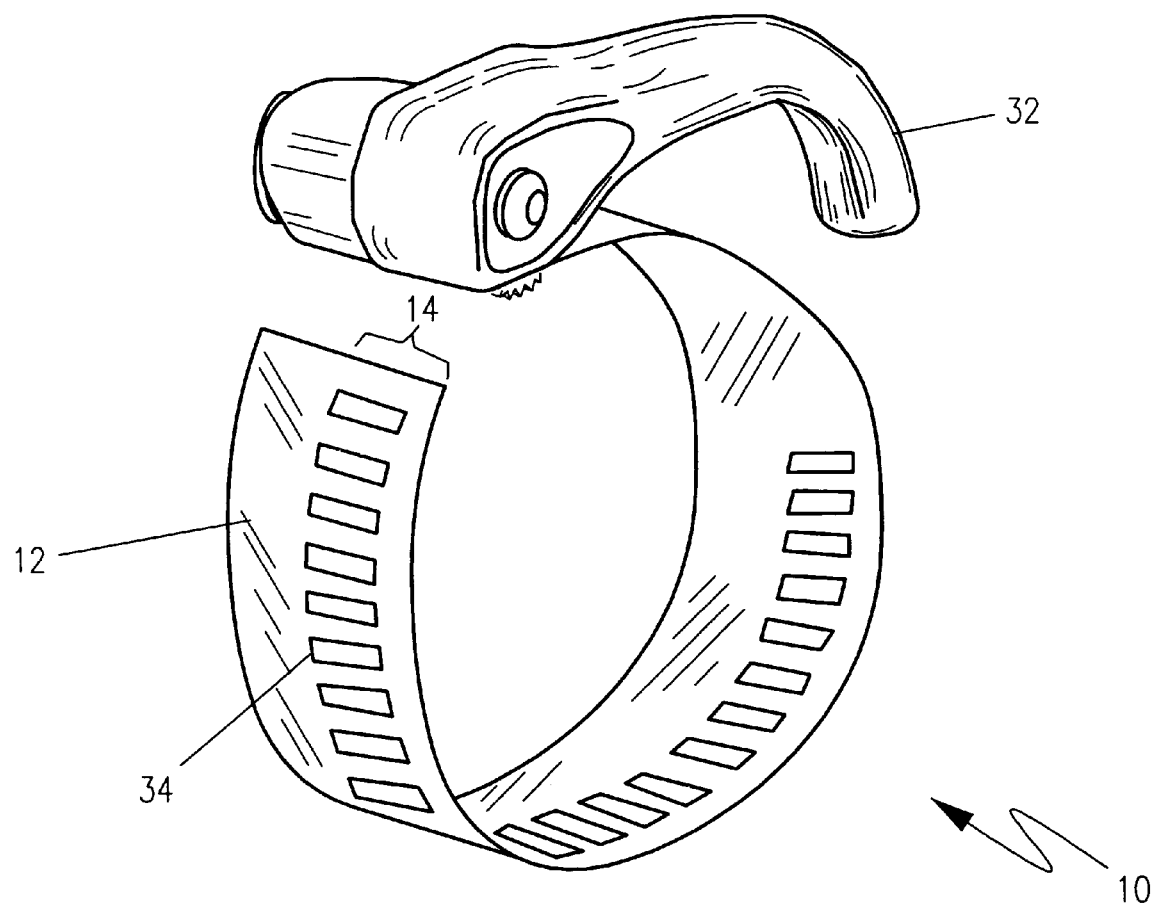
FIG. 1 is a perspective view of a universal muffler clamp and ratchet tightening device combination according to the preferred embodiment of the present invention.
Figure 2A:
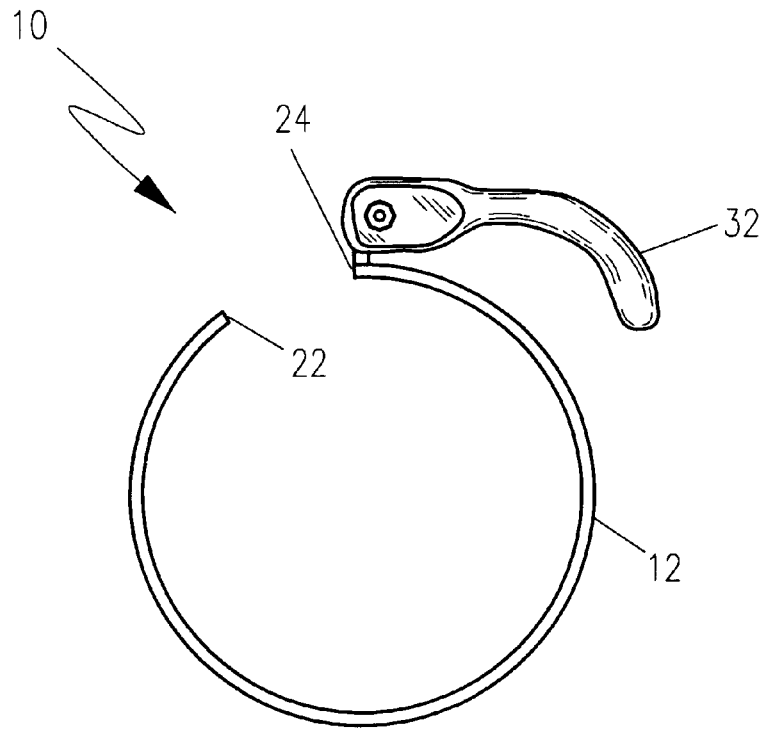
FIG. 2a is a left side elevational view thereof.
Figure 2B:
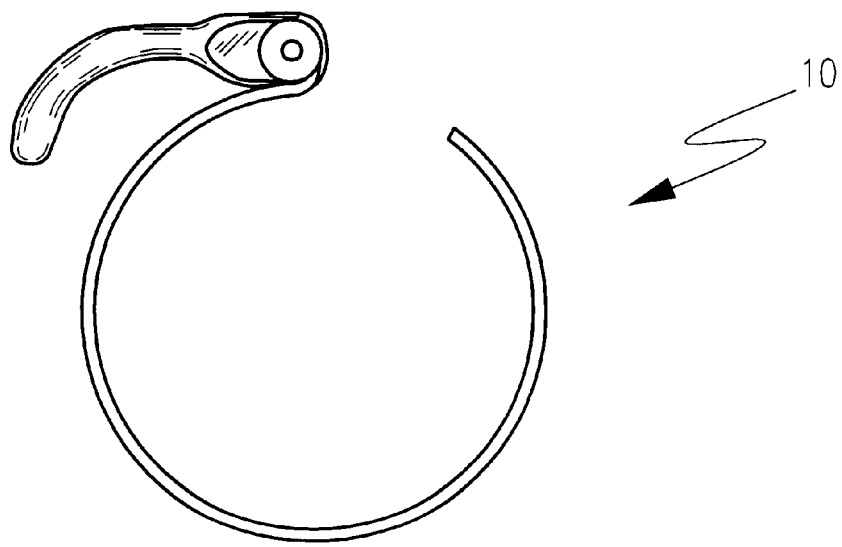
FIG. 2b is a right side elevational view thereof.
Figure 3:
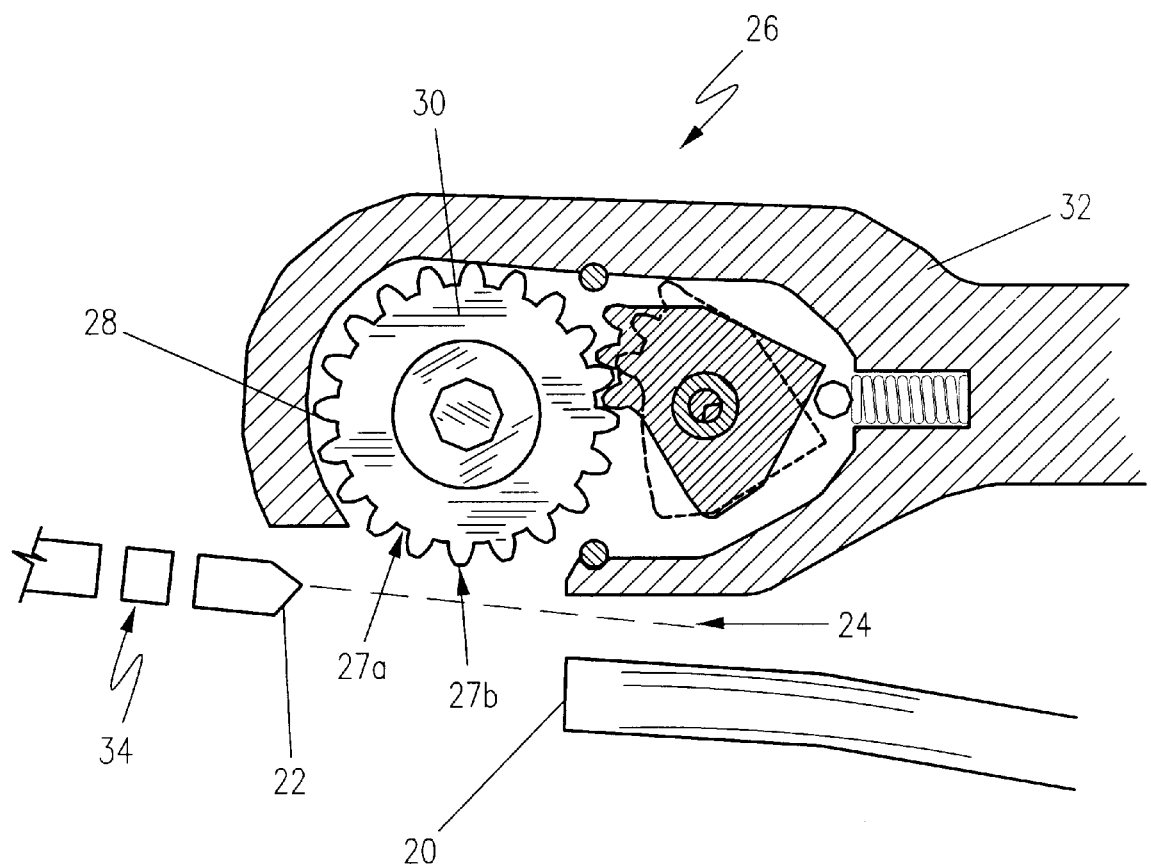
FIG. 3 is a cross sectional elevational view taken along the centerline of the ratchet tightening means.
Figure 4:
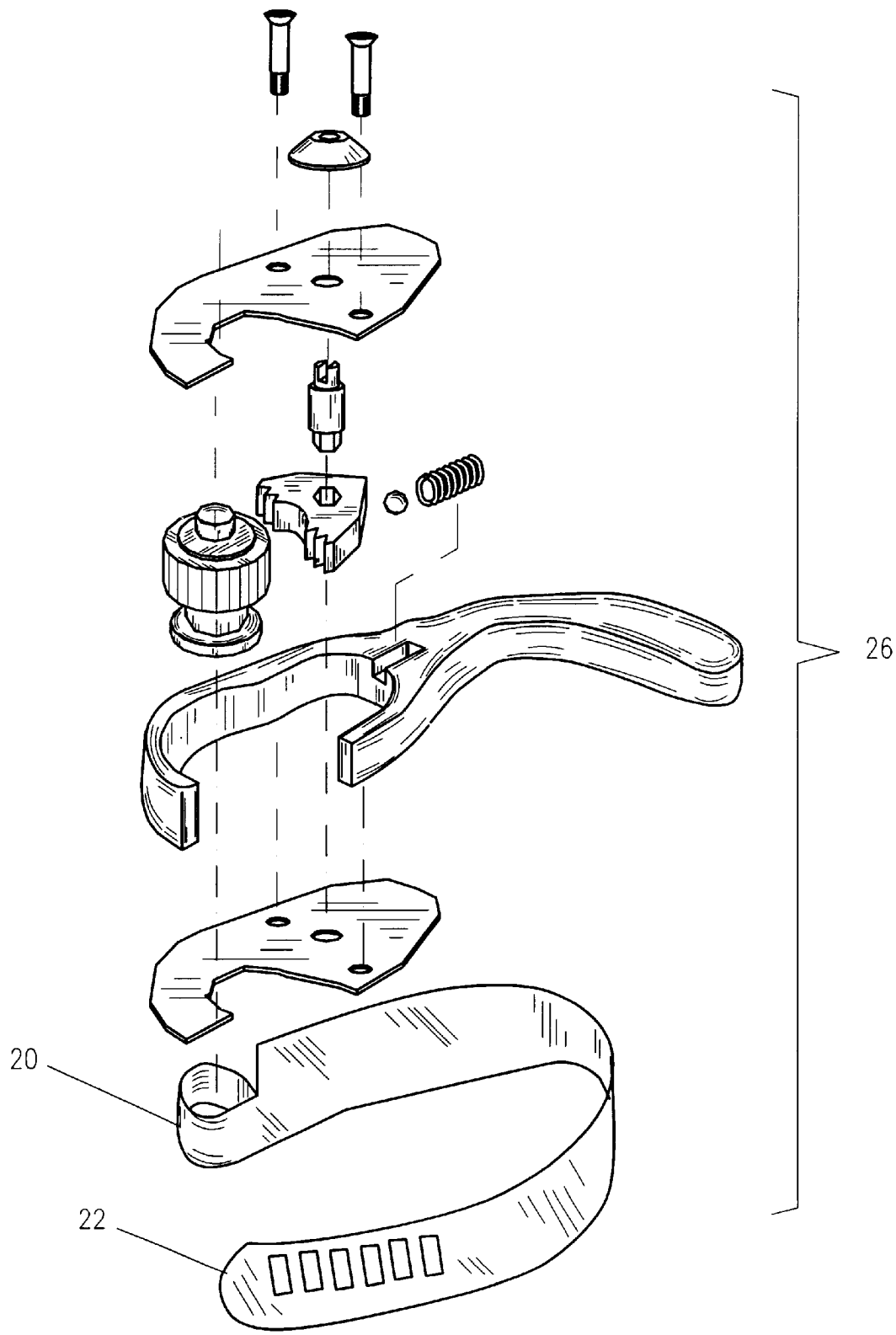
FIG. 4 is an exploded perspective view thereof.
Figure 5:
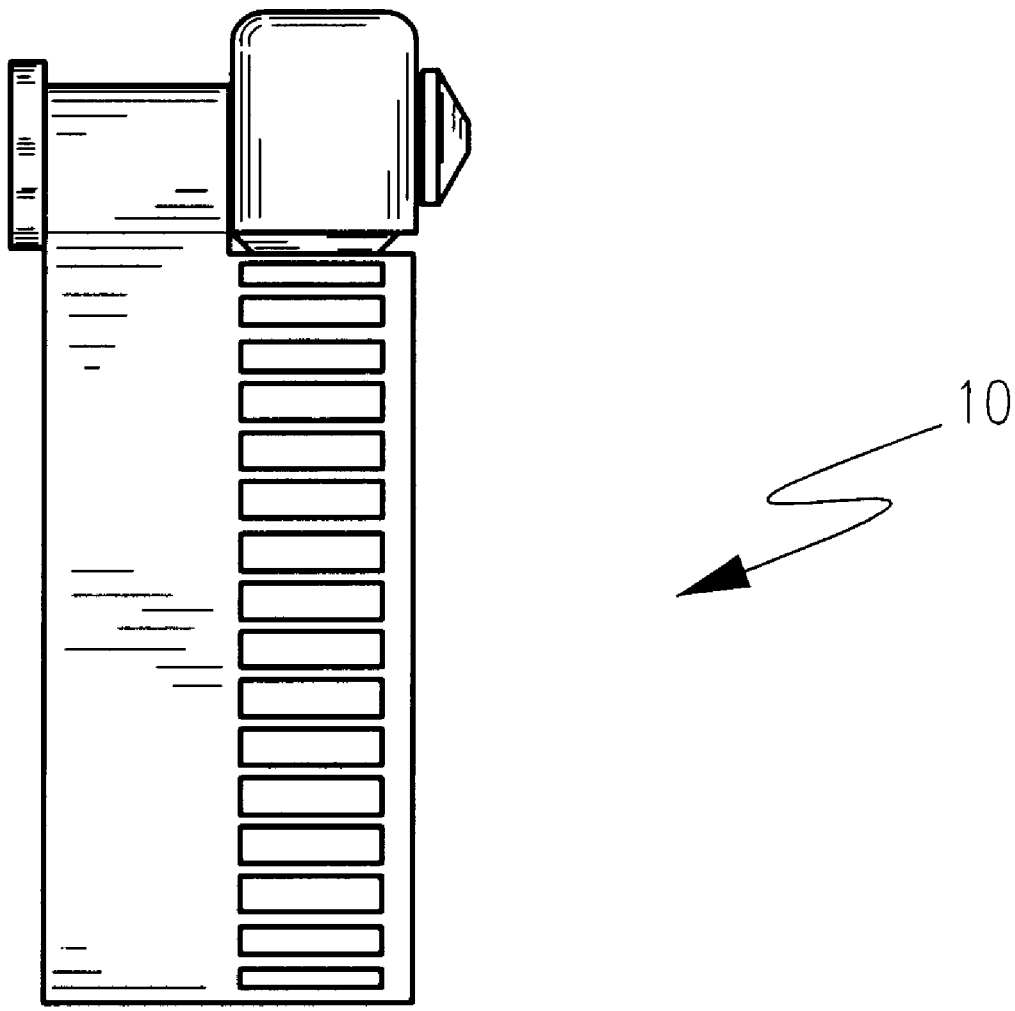
FIG. 5 in a front elevational view thereof.

Referring now to FIG. 1 to FIG. 5, a universal muffler clamp and ratchet tightening device combination 10 is shown, according to the preferred embodiment of the present invention, including a radially elongated clamping band 12 designed to completely circumscribe a standard vehicle exhaust pipe. The band 12 is laterally formed in a compound manner, having an outer band spine 14 forming the primary structure and an inner band ridge 16 extending laterally therefrom in an internal offset manner. An inner shoulder radius 18 provides a smooth transition between the outer band spine 14 and the inner band ridge 16.

The clamping band 12, although formed to completely circumscribe a standard cylindrical vehicle exhaust pipe, is formed in a generally "C" shaped manner, having a first connecting end 20 opposing a second connecting end 22 across an entrance gap, indicated as 24. In is envisioned that the band 12 is formed is such a manner as to have sufficient elastic properties so as to allow band 12 to be deformed only to the extent that the entrance gap 24 can be manually increased to a distance merely sufficient enough for the clamping band 12 to be fitted around a conventional cylindrical vehicle exhaust system pipe.

Extending generally perpendicularly outward from and attached to the first connecting end 20 is a hook shaped grasping means 26. Although many types of conventionally formed grasping means can be incorporated into the present invention as taught by the present disclosure in order to accomplish the current invention, it is felt that in its preferred embodiment a hook shaped grasping means 26 formed as tab extending from the outer band spine 14, outward from the first connecting end 20 and bent radially backward, away from the first connecting end 20 in a curled manner such as to form a connection seat 27a bounded by both the outer surface of the outer band spine 14 and a grasping hook sidewall 27b.

Extending generally parallel or obliquely outward from and attached to the second connecting end 22 is a connection loop 28. In its preferred embodiment a connection loop 28 shaped to grasp securely over and onto the grasping means 26 such as a secure two piece fastening can be achieved when the loop 28 is engaged with the hook shaped grasping means 26.

In its preferred embodiment, the connection loop 28 is positioned close to the second connecting end 26 in a manner that the loop 28 can be urged securely away from the opposed hook 26 after engagement. It is felt that a biasing means 30 should interact between the band 12 and the connection loop 26. Although a variety of biasing means could accomplish such a goal, it is felt that in its preferred embodiment the biasing means 30 would comprise a rotatable, cam levered clamp arm 32. A cam lever would cause the connection loop 28 to be urged in a forceful manner toward the clamp arm 32 when the clamp arm 32 is rotated in a downward, locking position. In order to increase the adjustability of the circumscribable diameters that the present invention can effectively be used with, it is felt that a manner of linearly positioning the clamp arm 32 along the outer band spine 14 will allow for the clamping band 12 to be used in an adjustable manner to circumscribe cylindrical exhaust pipes throughout a narrow but effective range of pipe circumferences. To accomplish this effect, the cam levered clamp arm 32 merely needs to be slidably affixed along the outer band spine in a manner that it can lockingly engage with one of a series of anchoring slots 34 when rotated into a locked position.

2. Operation of the Preferred Embodiment

In accordance with a preferred embodiment of the present invention, to use the present invention the clamping band 12 is placed around the pipe connection portions of an otherwise conventional vehicle exhaust system. The clamp closes around a connecting piece. Once the desired size is achieved, the clamp arm is then snapped shut and holds the pieces together. It is envisioned that the clamp arm will have an extended handle in order to allow the user to accomplish this closure process. This provides a ratchet tightening device that can aid in the installation process.

The foregoing description is included to illustrate the operation of the preferred embodiment and is not meant to limit the scope of the invention. Therefore, the scope of the invention is to be limited only by the following claims.

What is claimed is:

1. A universal muffler or radiator hose clamp and ratchet tightening device combination comprising:

a radially elongated clamping band for completely circumscribing a standard vehicle exhaust pipe, said band having an outer band spine forming a primary structure and an inner band ridge extending laterally therefrom and forming a series of anchoring slots in a linearly aligned manner; and, in combination, ratchetting grasping means pivotally affixed to said clamping band, said ratchetting grasping means capable of clamping to said clamping band and biasing closed said clamping band by urging said clamping band, along said series of anchoring slots, in a ratchetting manner; and a handle extension capable of affixing to said ratchetting grasping means for providing a removable grasping handle for increasing leverage upon tightening of said ratchetting grasping means.

* * * * *